US012471200B2

(12) United States Patent
Zhu et al.

(10) Patent No.: US 12,471,200 B2
(45) Date of Patent: Nov. 11, 2025

(54) LAMP POWER SUPPLY BASED ON DUAL-BUS CONTROL AND LIGHTING SYSTEM (71) Applicants: OPPLE LIGHTING CO., LTD., Shanghai (CN); SUZHOU OPPLE LIGHTING CO., LTD., Suzhou (CN)

(72) Inventors: Guangchuan Zhu, Shanghai (CN); Quanhui Han, Shanghai (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 96 days.

(21) Appl. No.: 18/592,742

(22) Filed: Mar. 1, 2024

(65) Prior Publication Data
US 2024/0244734 A1 Jul. 18, 2024

Related U.S. Application Data (63) Continuation of application No. PCT/CN2022/112473, filed on Aug. 15, 2022.

(30) Foreign Application Priority Data

Sep. 1, 2021 (CN) .......................... 202111019207.X (51) Int. Cl.
H05B 47/18 (2020.01)
H05B 45/355 (2020.01)
H05B 47/14 (2020.01)

(52) U.S. Cl.
CPC ........... *H05B 47/18* (2020.01); *H05B 45/355* (2020.01); *H05B 47/14* (2020.01)

(58) Field of Classification Search
CPC ...... H05B 47/18; H05B 45/355; H05B 47/14; H05B 47/185; H05B 45/3725; H05B 45/36; H05B 45/32–335
See application file for complete search history.

(56) References Cited

U.S. PATENT DOCUMENTS

2013/0221862 A1* 8/2013 Knoedgen .............. H05B 45/32
 315/200 R
2015/0366019 A1* 12/2015 Kuang ................. H05B 45/385
 315/206

FOREIGN PATENT DOCUMENTS

CN 203537628 U 4/2014
CN 107395228 A 11/2017
(Continued)

OTHER PUBLICATIONS

International Search Report of PCT Application No. PCT/CN2022/112473, dated Sep. 27, 2022 with English translation, (4p).

*Primary Examiner* — Renan Luque
(74) *Attorney, Agent, or Firm* — Arch & Lake LLP; Hao Tan; Shen Wang (57) ABSTRACT The present disclosure discloses a lamp power supply based on dual-bus control and a lighting system, the lamp power supply includes an input module, a rectifying module, a driving module, a detection module, a data transmission module, and a control module. In the case that the detection module detects that the bus voltage is less than a first preset voltage, the control module sends a turn-on signal to the data transmission module; the detection module and the data transmission module are connected to a dual bus through respective wires, so that the detection module and the data transmission module are both connected to the rectifying module, which can directly configure control information for the lamp without providing additional signal lines, thereby simplifying the structure and reducing costs.

11 Claims, 7 Drawing Sheets (56) References Cited

FOREIGN PATENT DOCUMENTS

| CN | 110351922 A | 10/2019 |
| CN | 213783648 U | 7/2021 |
| CN | 113709943 A | 11/2021 |
| WO | 2021031493 A1 | 2/2021 |

* cited by examiner

LAMP POWER SUPPLY BASED ON DUAL-BUS CONTROL AND LIGHTING SYSTEM

CROSS-REFERENCE TO RELATED APPLICATION

This application is based upon and claims the priority of PCT patent application No. PCT/CN2022/112473 filed on Aug. 15, 2022 which claims priority to the Chinese patent application No. 202111019207.X filed on Sep. 1, 2021, the entire contents of which are hereby incorporated by reference herein for all purposes.

TECHNICAL FIELD

The present disclosure relates to the field of power supply technology, and specifically to a lamp power supply based on dual-bus control and a lighting system.

BACKGROUND

In the market of lighting power supply, most of them have constant current output, and the advantages of this design are that the electronic aspect is relatively simple and the cost is relatively low.

SUMMARY

The present disclosure provides a lamp power supply based on dual-bus control and a lighting system.

According to a first aspect of the present disclosure, the examples of the present disclosure provide a lamp power supply based on dual-bus control. The lamp power supply may include an input module configured for providing alternating current, a rectifying module configured for converting input alternating current into direct current, and a driving module configured for controlling load driving; the input module, the rectifying module and the driving module are connected to each other through a dual bus.

The lamp power supply may further include: a detection module, which is configured to acquire and detect a bus voltage output by the rectifying module; a data transmission module, which is configured to transmit configuration control information; and a control module, which is configured to send a turn-on signal to the data transmission module to receive the configuration control information provided by the data transmission module, in the case that the detection module detects that the bus voltage is less than a first preset voltage; the detection module and the data transmission module are connected to the dual bus through respective wires, so that the detection module and the data transmission module are both connected to the rectifying module.

According to another aspect of the present disclosure, the examples of the present disclosure provide a lighting system, which includes the lamp power supply according to the example above and a lamp connected to the lamp power supply.

It is to be understood that both the foregoing general description and the following detailed description are exemplary and explanatory only and are not restrictive of the present disclosure.

BRIEF DESCRIPTION OF THE DRAWINGS

The following detailed description of examples of the present disclosure, in conjunction with the drawings, will make the technical solutions and other beneficial effects of the present disclosure apparent.

DETAILED DESCRIPTION

The technical solutions of the examples of the present disclosure will be described in a clearly and fully understandable way in conjunction with the drawings of the examples of the present disclosure. Apparently, the described examples are just a part but not all of the examples of the present disclosure. Based on the examples of the present disclosure, those skilled in the art can obtain other example(s), without any inventive work, which should be within the scope of the present disclosure.

The terms "first" and "second" are used in the present disclosure for descriptive purposes only and are not to be understood as indicating or implying relative importance or implicitly specifying the number of technical features indicated. Thus, a feature defined with the terms "first", "second" may expressly or implicitly include one or more of the features. In the description of the present disclosure, "a plurality of" means two or more, unless otherwise expressly and specifically limited.

In the description of the present disclosure, it should be noted that, unless otherwise explicitly specified and defined, the terms "mounted", "connection" and "connected" should be understood broadly, for example, which may be a fixed connection, a detachable connection, or an integral connection; it may be a mechanical connection, an electrical connection or a connection that can communicate with each other; it may be a direct connection or an indirect connection through an intermediate medium; it may also be a connection within two elements or an interaction between the two elements. For those of ordinary skill in the art, the specific meanings of the above-mentioned terms in the present disclosure may be understood in specific situations.

In the case where the output of a Light Emitting Diode (LED) lamp is fixed, the power, brightness and other parameters of the entire lamp cannot be changed. If there are different requirements for the power, brightness and other parameters of the entire lamp, it is necessary to purchase or replace other lamps, power supplies, and the like. In order to meet different requirements, the lamps with dimmable light are further provided; or the products that is configured with control information for a lamp to adjust electronic parameters are further provided for meeting different requirements. The relative costs of the products with dimmable light may be higher, while the relative costs of the products, which is configured with control information for a lamp to adjust electronic parameters to meet different requirements, are between the conventional products and the dimmable products.

Figure 1:
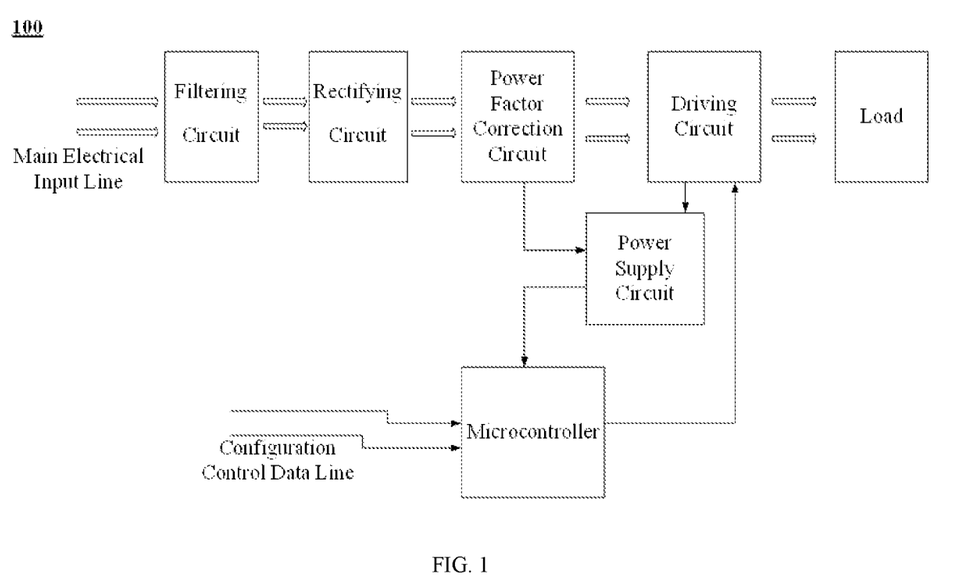
FIG. 1 is a schematic diagram of an architecture of a lamp power supply.

The product electronic architecture 100 that is configured with control information/data for lamps is illustrated in FIG. 1. In the case that the control information/data for lamp electronics is being configured, it is necessary to additionally provide (or introduce) two independent information/data lines (both of which are only for configuring the control information), and thus, a controller can configure the control information/data for lamps electronics through these two information/data lines.

As illustrated in FIG. 1, the two independent lines to configure the control information for the lamps are only used when the control information/data for the lamps are being configured, and are not used at any other time, which renders the low utilization; moreover, there is a risk that production adaptation or on-site installation personnel may be prone to puzzle about input lines, output lines, and configuration lines (that is, the more power supply lead-out lines are, the more difficult for production adaptation or on-site installation personnel to distinguish them are); in addition, this manner further increases the workload (for example, in order to prevent the two configuration control signal lines from touching other lines such as input lines/output lines, it is necessary to perform protective measures such as wrapping); and if the lamps are waterproof products with high waterproof level, the more ports they have, the more difficult and risky it will be for the waterproof performance of the products.

Therefore, there is a need to propose solutions for such technical problems.

The following disclosure provides many different examples or examples for implementing the various structures of the present disclosure. To simplify the present disclosure, the components and arrangements of specific examples are described below. They are merely examples and are not intended to limit the present disclosure. Furthermore, the present disclosure may repeat reference numerals and/or reference letters in different examples, such repetition is for the purpose of simplicity and clarity and does not by itself indicate a relationship between the various examples and/or arrangements discussed.

Figure 2:
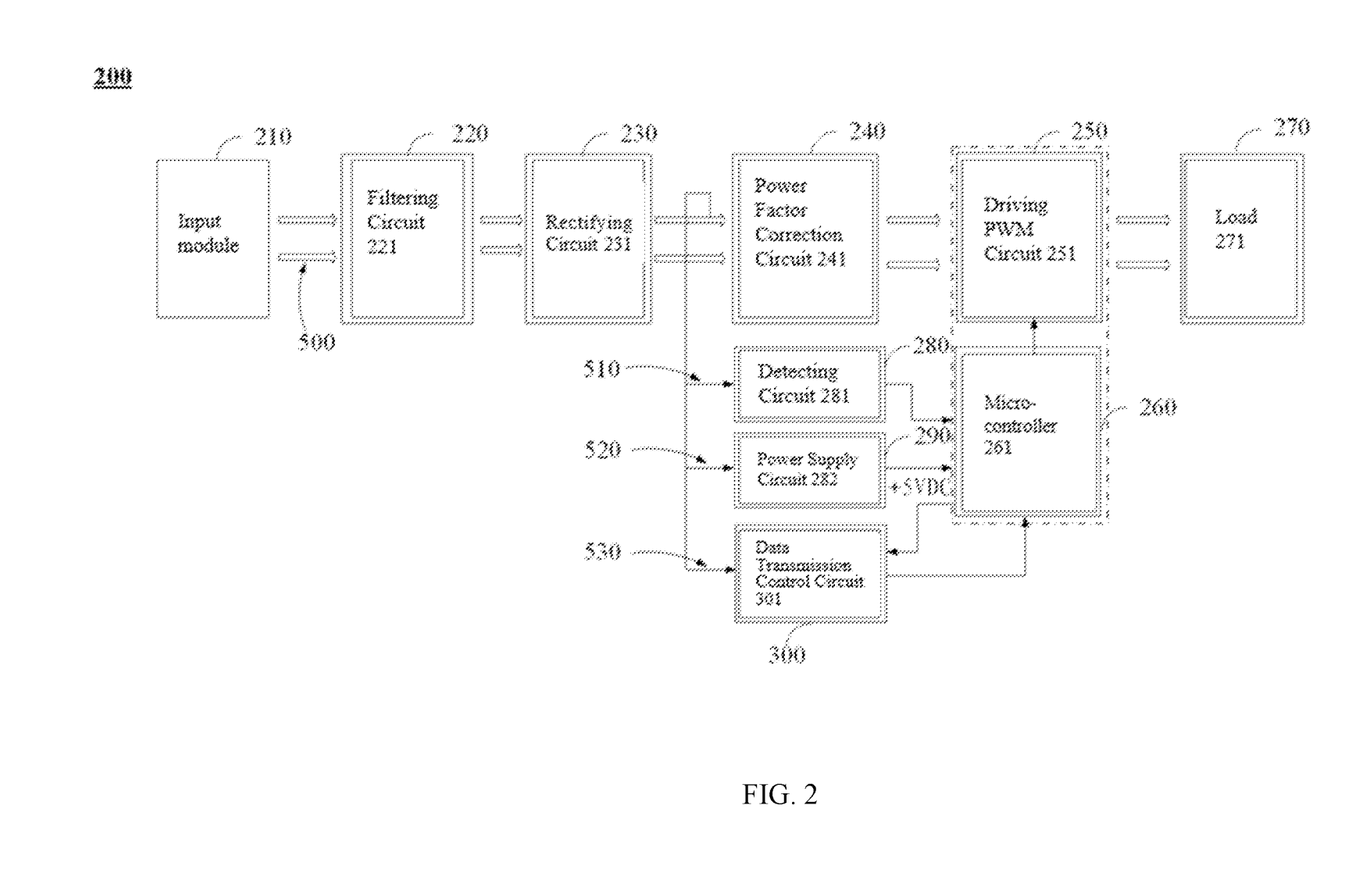
FIG. 2 is a schematic diagram of an architecture of a lamp power supply based on dual-bus control provided by an example of the present disclosure.
Figure 3:
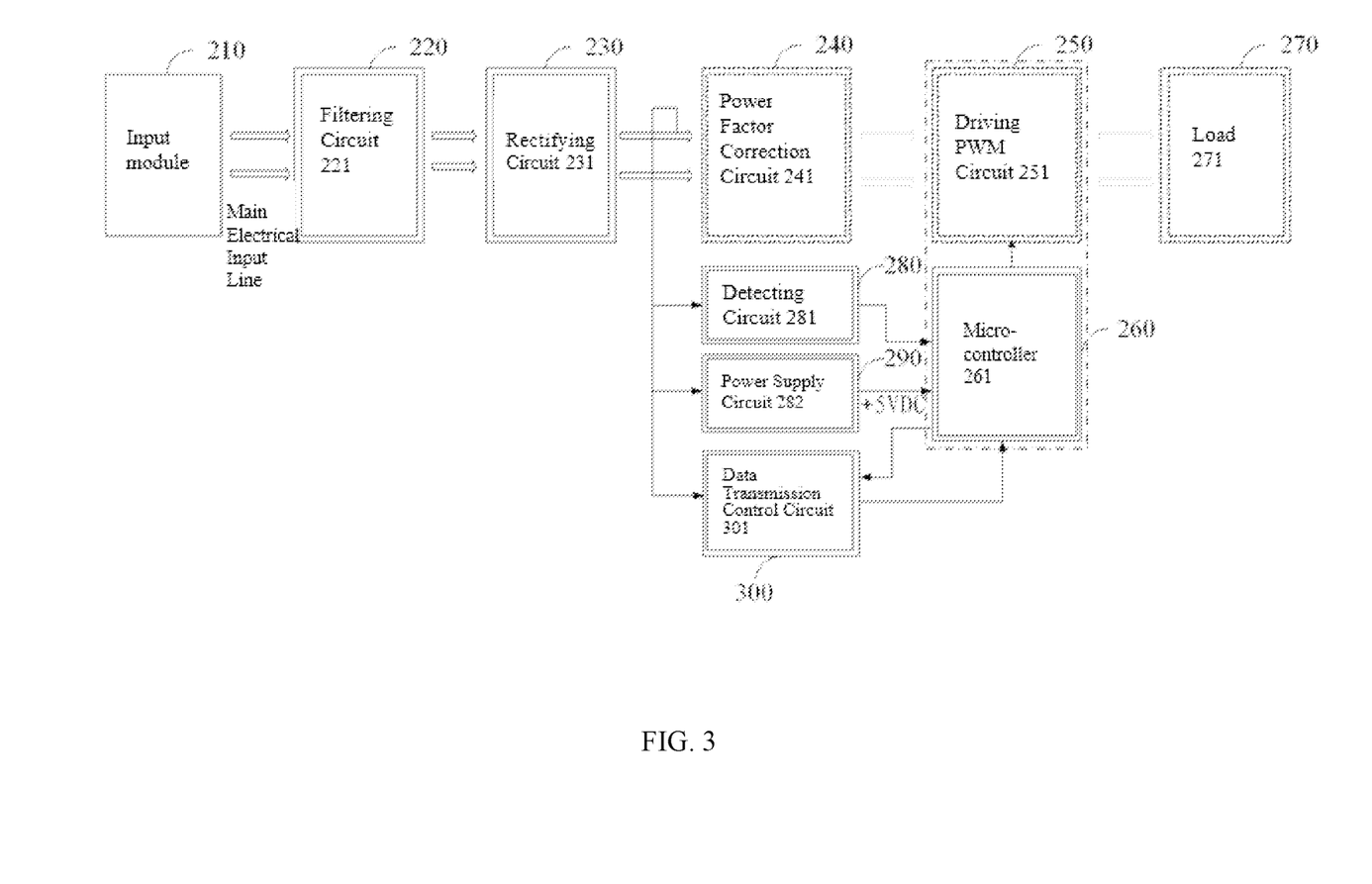
FIG. 3 is a schematic diagram of wires of a lamp power supply based on dual-bus control provided by the examples of the present disclosure, wherein the lamp power supply is in a state of configuring the control information.

FIG. 2 is a schematic diagram of an architecture of a lamp power supply based on dual-bus control provided by an example of the present disclosure; FIG. 3 is a schematic diagram of wires of a lamp power supply based on dual-bus control provided by the examples of the present disclosure, wherein the lamp power supply is in a state of configuring the control information; and FIG. 4 is a schematic diagram of wires of a lamp power supply based on dual-bus control provided by the examples of the present disclosure, wherein the lamp power supply is in a state of normal operation.

Figure 4:
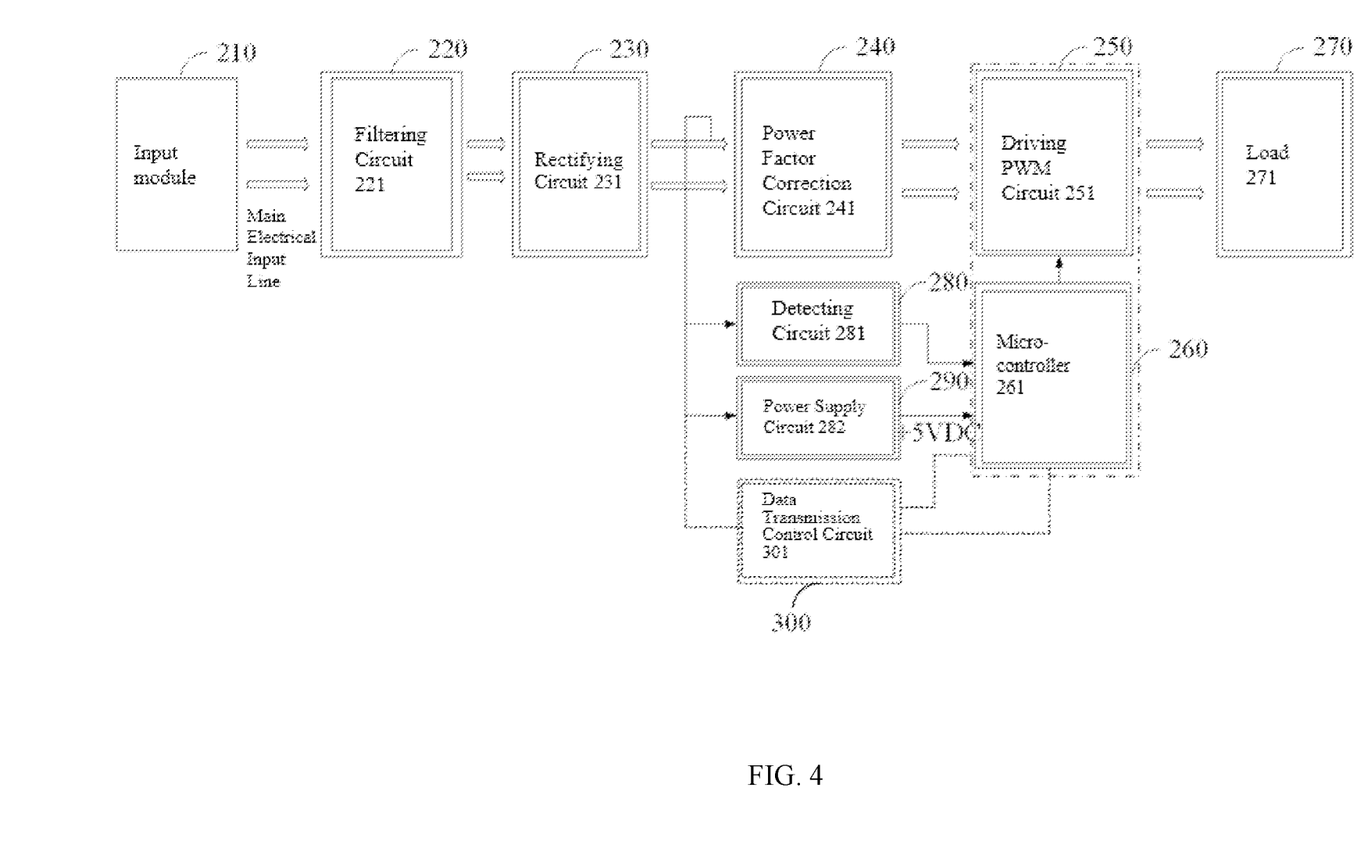
FIG. 4 is a schematic diagram of wires of a lamp power supply based on dual-bus control provided by the examples of the present disclosure, wherein the lamp power supply is in a state of normal operation.

Referring to FIG. 2 to FIG. 4, an example of the present disclosure provides a lamp power supply 200 based on dual-bus control, which includes an input module 210 for providing alternating current, a rectifying module 230 for converting input alternating current into direct current, and a driving module 250 for controlling load driving, and the input module 210, the rectifying module 230 and the driving module 250 are connected to each other through a dual bus 500. The lamp power supply 200 further includes: a detection module 280, which is configured to acquire and detect a bus voltage output by the rectifying module 230; a data transmission module 300, which is configured to transmit configuration control information; and a control module 260, which is configured to send a turn-on signal to the data transmission module 300 to receive the configuration control information provided by the data transmission module 300 in the case that the detection module 280 detects that the bus voltage is less than a first preset voltage. The detection module 280 and the data transmission module 300 are respectively connected to the dual bus 500 through respective wires (for example, a first wire 510 and a third wire 530 as illustrated in FIG. 2), so that the detection module 280 and the data transmission module 300 are both connected to the rectifying module 230.

It should be noted that the dual bus 500 described in the present disclosure refers to dual lines including a live line and a neutral line (L/N), and configuration control data line is the abbreviation of a wire used to configure control information or of a wire used to configure control data, which means that the line can transmit either the configured control information or the configured control data, as the same below.

The lamp power supply 200 based on dual-bus control described in the present disclosure may directly configure the control information/data for lamps or products or devices through live/neutral (i.e., L/N) dual lines without the need to additionally provide (or introduce) two signal/data lines, which is capable of simplifying the structure and reducing the safety risk, reducing line materials and reducing the risk of connecting wrong lines, and reducing the workloads of production personnel and on-site installation personnel.

The lamp power supply 200 based on dual-bus control is further described below with reference to the drawings.

Specifically, the input module 210 is configured to provide alternating current. The rectifying module 230 may include a rectifying circuit 231 for converting the input alternating current into direct current and providing a bus voltage for the detection module 280, the power supply module 290 and the data transmission module 300 described below. The driving module 250 may include a driving PWM (Pulse Width Modulation) circuit for modulating the width of a series of pulses to equivalently obtain a required waveform (including shape and amplitude), thereby controlling load driving. The input module 210, the rectifying module 230 and the driving module 250 are connected to each other through the dual bus 500. The dual bus 500 between the input module 210 and the rectifying module 230 may also be called a main electrical input line.

In some examples, a filtering module 220 is further provided between the input module 210 and the rectifying module 230, and the filtering module 220 is respectively connected to the input module 210 and the rectifying module 230 through the dual bus 500. The filtering module 220 may include a filtering circuit 221 for filtering alternating current.

In some examples, a power factor correction module 240 is further provided between the rectifying module 230 and the driving module 250, and the power factor correction module 240 is connected to the rectifying module 230 and the driving module 250 respectively through the dual bus 500. The power factor correction module 240 includes a power factor correction circuit 241 for adjusting the power factor PF received by the driving module 250.

In the present example, the lamp power supply 200 further includes a power supply module 290, and the power supply module 290 is connected to the dual bus 500 through a corresponding wire, to cause the power supply module 290 to be connected to the rectifying module 230. In other words, the power supply module 290 is connected to the rectifying module 230 through a second wire 520 (equivalent to a bus) leading from the dual bus 500. The power supply module 290 may include a power supply circuit 282 for adjusting the bus voltage provided by the rectifying module 230 to a power supply voltage, so as to supply the electrical power to the control module 260.

Continuing to refer to FIG. 2 to FIG. 4, the lamp power supply 200 further includes a detection module 280 and a data transmission module 300. For example, the detection module 280 may include a detection circuit 281, which is configured to acquire and detect the bus voltage output by the rectifying module 230. The data transmission module 300 may include a data transmission control circuit 301 for transmitting the configuration control information.

The detection module 280 and the data transmission module 300 are respectively connected to the dual bus 500 through respective wires, so that the detection module 280 and the data transmission module 300 are both connected to the rectifying module 230. In other words, the detection module 280 is connected to the rectifying module 230 through the first wire 510 (equivalent to a bus) leading from the dual bus 500. Similarly, the data transmission module 300 is connected to the rectifying module 230 through the third wire 530 (equivalent to a bus) leading from the dual bus 500. Because the dual bus 500 is an line which has been installed, it is easier to lead wires from the dual bus 500, and the installation/connection is more convenient, and thus, compared with the prior art in which dedicated configuration control data lines are provided, the lamp power supply 200 in the present disclosure is designed so as to be capable of simplifying the structure and reducing the safety risk, reducing line materials and reducing the risk of connecting wrong lines, and reducing the workloads of production personnel and on-site installation personnel.

Continuing to refer to FIG. 2 to FIG. 4, the control module 260 is configured to send a turn-on signal to the data transmission module 300 to receive the configuration control information provided by the data transmission module 300 in the case that the detection module 280 detects that the bus voltage is less than a first preset voltage. The control module 260 is further configured to send a turn-off signal to the data transmission module 300 in the case that the detection module 280 detects that the bus voltage is greater than or equal to the first preset voltage, to cause the data transmission module 300 to enter a turn-off state.

Specifically, the data transmission module 300 is in the turn-off state by default. As illustrated in FIG. 3, in the case that a microcontroller 261 (or micro control unit, MCU) in the control module 260 detects that the bus voltage is less than a first setting value through the detection module 280, the microcontroller 261 may send a turn-on signal to the data transmission module 300 to enable the data transmission control circuit 301 to work. After that, the data transmission control circuit 301 may transmit the configuration control information to the microcontroller 261, thereby enabling the microcontroller 261 to perform configuration operations according to the configuration control information, as further described below. As illustrated in FIG. 4, in the case that the microcontroller 261 detects that the bus voltage is greater than or equal to the first setting value through the detection module 280, the microcontroller 261 may send a turn-off signal (or an idle signal) to the data transmission module 300 to cause the data transmission control circuit 301 to enter a turn-off state, and disconnect the wire connection between the microcontroller 261 and the data transmission control circuit 301. After receiving the configuration control information provided by the data transmission module 300, the microcontroller 261 in the control module 260 sends a control signal according to the configuration control information to the driving module 250, so as to cause the driving module 250 to drive a load in the output module 270 in response to the control signal; herein the output module 270 is connected to the driving module 250 through the dual bus 500. Because the configuration control information can be customized according to different needs, the microcontroller 261 controls the driving PWM circuit 251 in the driving module 250 according to different configuration control information, so that the driving PWM circuit 251 can output corresponding output parameters in the case that it works together with the microcontroller 261, so as to be able to meet the different needs of different customers.

As mentioned above, in the present example, the first setting value may be 9V. In other examples, the first setting value may be other low voltage values, not limited to 9V. In the present example, the bus voltage greater than the first setting value may be, for example, 36V.

It should be noted that the control module 260 may be attached to the driving module 250 or separated from the driving module 250. In the present example, the control module 260 is attached to the driving module 250, that is, the two modules are integrated together to form a single unit (as illustrated by the dotted line in FIG. 2). Specifically, the microcontroller 261 in the control module 260 may be integrated with a driver (not illustrated in the figures) in the driving module 250. Such a design can save the area of the circuit layout and further reduce the material cost.

Figure 5:
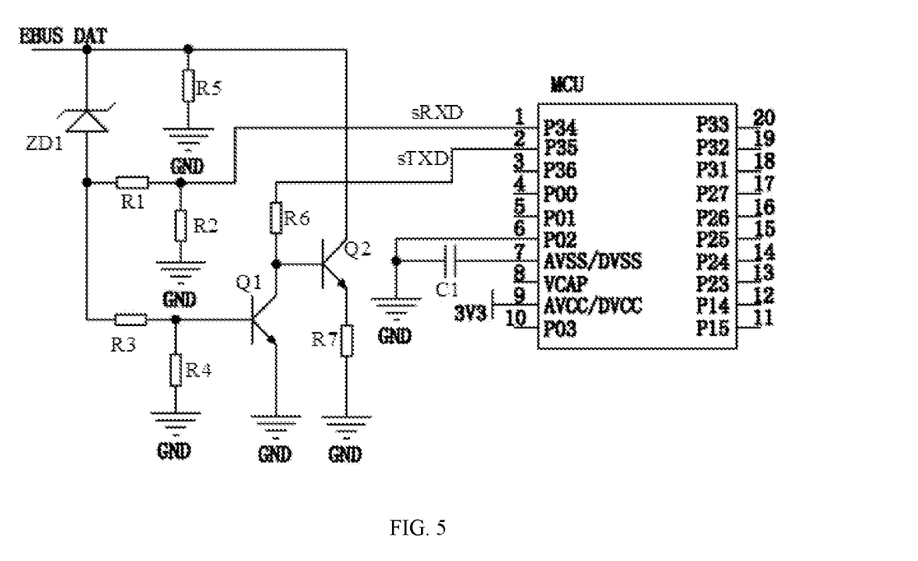
FIG. 5 is a schematic diagram of circuit connections of the control module illustrated in FIG. 2.

FIG. 5 is a schematic diagram of circuit connections of the control module 260 illustrated in FIG. 2.

Referring to FIG. 5, in the present example, the control module 260 may specifically include a microcontroller 261, a first zener diode ZD1, a first resistor R1, a second resistor R2, a third resistor R3, a fourth resistor R4, a fifth resistor R5, a sixth resistor R6, a seventh resistor R7, a first switching transistor Q1, a second switching transistor Q2, and a first capacitor C1. A first terminal of the first zener diode ZD1 is connected to an input terminal of the control module 260, and a second terminal of the first zener diode ZD1 is connected to a first terminal of the first resistor R1 and a first terminal of the third resistor R3, respectively. A second terminal of the first resistor R1 is connected to a first terminal of the second resistor R2 and a first pin of the microcontroller 261, respectively. The first terminal of the second resistor R2 is connected to the first pin of the microcontroller 261, and a second terminal of the second resistor R2 is grounded (for example, is connected to GND). A second terminal of the third resistor R3 is connected to a control terminal of the first switching transistor Q1 and a first terminal of the fourth resistor R4, respectively. The first terminal of the fourth resistor R4 is connected to the control terminal of the first switching transistor Q1, and a second terminal of the fourth resistor R4 is grounded (for example, is connected to GND). A first terminal of the first switching transistor Q1 is connected to a first terminal of the sixth resistor R6 and a control terminal of the second switching transistor Q2, respectively, and a second terminal of the first switching transistor Q1 is grounded (for example, is connected to GND). The first terminal of the sixth resistor R6 is connected to the control terminal of the second switching transistor Q2, and a second terminal of the sixth resistor R6 is connected to a second pin of the microcontroller 261. A first terminal of the second switching transistor Q2 is connected to a first terminal of the fifth resistor R5, and a second terminal of the second switching transistor Q2 is connected to a first terminal of the seventh resistor R7. A second terminal of the fifth resistor R5 is connected to the input terminal of the control module 260, and a second terminal of the seventh resistor R7 is grounded (for example, is connected to GND). A seventh pin of the microcontroller 261 is grounded (for example, is connected to GND), an eighth pin of the microcontroller 261 is connected to a first terminal of the first capacitor C1, and a second terminal of the first capacitor C1 is grounded (for example, is connected to GND).

In the above-mentioned circuit, the first zener diode ZD1 is configured to protect the microcontroller 261. The first resistor R1 and the second resistor R2 can divide the bus voltage to obtain a TTL level signal, and provide the TTL level signal to the first pin of the microcontroller 261 (i.e., a pin P34 illustrated in FIG. 5, which is configured to receive an sRXD signal). The TTL (transistor-transistor logic) level signal is represented in binary, for example, a low-level signal is equivalent to a logic signal of "0", and a high-level signal is equivalent to a logic signal of "1".

Furthermore, in the case that the microcontroller 261 of the control module 260 detects that the bus voltage is less than the first setting value, the microcontroller 261 may send a turn-on signal to the data transmission module 300, to cause the data transmission control circuit 301 to enter a turn-on state. Then, a high-level signal is input through the bus, for example, 36V, the potential of the common node of the third resistor R3 and the fourth resistor R4 is relatively high, causing the first switching transistor Q1 to enter a turn-on state. At this time, a conduction is formed between the second pin of the microcontroller 261 (the second pin is a sending pin, such as a pin P35 illustrated in FIG. 5, which is used for transmitting the sTXD signal), the sixth resistor R6 and the first switching transistor Q1, the process is equivalent to controlling the first switching transistor Q1 so that the potential of the first pin of the microcontroller 261 (the first pin is a receiving pin) is realized as a change from a low potential to a high potential (i.e., from "0" to "1"), whereby the configuration control information/data can be transmitted to the microcontroller 261 through the bus. In the case that the bus voltage is controlled to be pulled low, that is, the bus is input with a low-level signal, for example, less than 9V, the potential of the common node of the third resistor R3 and the fourth resistor R4 is relatively low, causing the first switching transistor Q1 to be in a turn-off state; at this time, a conduction is formed between the second pin of the microcontroller 261, the sixth resistor R6, and the second switching transistor Q2, and the process is equivalent to causing the microcontroller 261 to transmit data back through the bus by controlling the second switching transistor Q2, so that bidirectional communication between the bus and the microcontroller 261 can be realized.

Therefore, by means of the circuit design mentioned above, it is possible to realize that in the case that the microcontroller 261 detects that the bus voltage is less than the first setting value through the detection module 280, the microcontroller 261 may send a turn-on signal to the data transmission module 300 to turn on the data transmission control circuit 301, so as to enable it to operate. Then, the change of logic "0" signal to logic "1" signal received by the microcontroller 261 pins is utilized to transmit information to the microcontroller 261 through the bus, and the microcontroller 261 can then also transmit data back to the bus. Further, the bus and the microcontroller 261 communicate with each other through specific timing and protocols, thereby realizing the interaction of data. Therefore, the microcontroller 261 controls the driving PWM circuit 251 in the driving module 250 according to different configuration control information, so that the driving PWM circuit 251 can output corresponding output parameters while working together with the microcontroller 261, thereby meeting different requirements of different customers.

Through such configuration and design, the lamp power supply 200 described in the present disclosure may directly configure the control information/data for lamps or products or devices without the need to additionally provide two signal/data lines, which is capable of simplifying the structure and reducing the safety risk, reducing line materials and reducing the risk of connecting wrong lines, and reducing the workloads of production personnel and on-site installation personnel.

In some examples, after receiving the configuration control information sent by the data transmission control circuit 301, the microcontroller 261, according to the configuration control information, performs online updating of the configuration control information (e.g., operating parameters of lamps, address information of lamps, etc.) of the corresponding load 271 (such as a lamp), so as to avoid the need to disassemble related lamps and related drivers in the prior art, and to be able to achieve the effect of saving labor and material resources.

Figure 6:
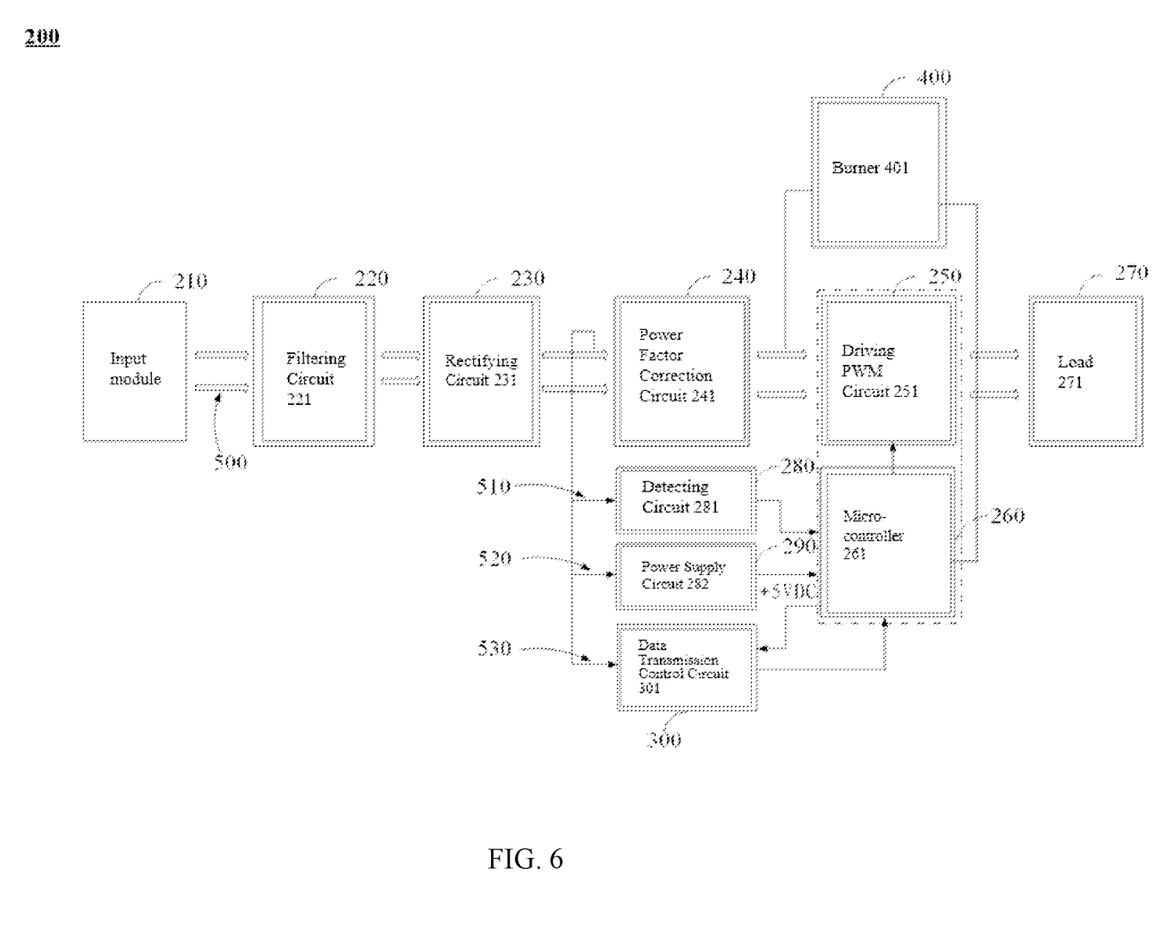
FIG. 6 is a schematic diagram of an architecture of a lamp power supply based on dual-bus control provided by another example of the present disclosure.

As illustrated in FIG. 6, in some examples, the lamp power supply 200 further includes a program data module 400, and the program data module 400 is connected to the dual bus (i.e., the live/neutral dual lines herein). The program data module 400 includes a circuit with a burner 401, which is configured to perform a burning program operation on the microcontroller 261 integrated in the driver, that is, the burner 401 can burn and write parameters or data related to the load (such as address information of the lamp, on/off interval cycle duration of the lamp, etc.), or can burn and write information or data associated with the configuration control information. Further, in the case that the number of microcontrollers 261 is plural, the burner may be connected to a plurality of drivers which are integrated with microcontrollers 261, and each driver corresponds to one of the microcontrollers 261. The burner 401 may adopt a broadcast-type protocol to perform burning program operations to achieve simultaneous burning for each microcontroller, or perform a targeted burning for a designated microcontroller, which can improve burning efficiency.

In addition, in the case that the different burning programs are executed on the same type of microcontroller, a responsive protocol may be used to perform the burning program operation, which can ensure the correctness of the burned data. The working mechanism of the bidirectional communication between the burner 401 and the microcontroller 261 may be similar to the working mechanism of the bidirectional communication between the bus and the microcontroller 261 mentioned above, that is, a change in the bus voltage (i.e., a change between the high and low voltages) is utilized for transmitting data (e.g., burned data) or information; the burned data is transmitted from the burner to the microcontroller in the case that the bus voltage changes from the low voltage to the high voltage, whereas the microcontroller 261 transmits the data back through the bus in the case that the bus voltage is less than the preset value (i.e., in the case that the bus is input with a low-level signal); in this way, the bidirectional communication between the burner and the microcontroller 261 can be achieved. It can be contemplated that the communication mode between the burner 401 and the microcontroller 261 is not limited to this. In this way, the lamp power supply 200 can realize a configuration mode in which one burner corresponds to a plurality of LED drivers by means of the burner 401 and the microcontroller 261 integrated into the driver, thereby improving the configuration efficiency and saving labor and material resources.

Based on the same inventive concept, an example of the present disclosure further provides a lighting system 1000.

Figure 7:
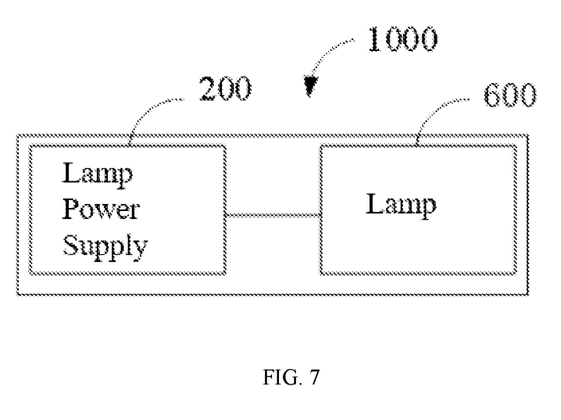
FIG. 7 is a schematic diagram of an architecture of a lighting system provided by an example of the present disclosure.

FIG. 7 is a schematic diagram of an architecture of a lighting system provided by an example of the present disclosure.

Referring to FIG. 7, the lighting system 1000 in the example of the present disclosure includes the lamp power supply 200 based on dual-bus control described in any one of the above examples and a lamp 600 connected to the lamp power supply 200. For the specific structure and function of the lamp power supply 200, please refer to the above detailed description and will not be described again here. The lamp 600 may be an LED lamp, but is not limited thereto, and may also be other lighting lamps matched with the lamp power supply 200.

The lighting system described in the present disclosure may also directly configure the control information/data for lamps through live/neutral dual lines without the need to additionally provide two signal/data lines, which is capable of simplifying the structure of the entire lighting system, and is further capable of reducing the cost.

The examples of the present disclosure provide a lamp power supply based on dual-bus control and a lighting system, which aims to directly configure the control information/data for lamps through live/neutral (i.e., L/N) dual lines without the need to additionally provide (or introduce) two signal/data lines, thereby simplifying the structure of the entire lamp power supply, reducing costs, and reducing the workload of the production personnel (that is, increasing the yield ratio), as well as the workload of the on-site installation personnel.

According to a first aspect of the present disclosure, the examples of the present disclosure provide a lamp power supply based on dual-bus control, including an input module configured for providing alternating current, a rectifying module configured for converting input alternating current into direct current, and a driving module configured for controlling load driving; the input module, the rectifying module and the driving module are connected to each other through a dual bus, and the lamp power supply further includes: a detection module, which is configured to acquire and detect a bus voltage output by the rectifying module; a data transmission module, which is configured to transmit configuration control information; and a control module, which is configured to send a turn-on signal to the data transmission module to receive the configuration control information provided by the data transmission module, in the case that the detection module detects that the bus voltage is less than a first preset voltage; the detection module and the data transmission module are respectively connected to the dual bus through respective wires, so that the detection module and the data transmission module are both connected to the rectifying module.

Optionally, the data transmission module is in a turn-off state by default.

Optionally, the control module is attached to the driving module or separated from the driving module.

Optionally, the lamp power supply further includes a filtering module, and the filtering module is provided between the input module and the rectifying module, and is configured to filter the alternating current.

Optionally, the lamp power supply further includes a power factor correction module, and the power factor correction module is provided between the rectifying module and the driving module, and is configured to adjust a power factor received by the driving module.

Optionally, the lamp power supply further includes a power supply module, and the power supply module is connected to the dual bus through a corresponding wire, to cause the power supply module to be connected to the rectifying module; and the power supply module is configured to adjust the bus voltage provided by the rectifying module to a power supply voltage so as to supply power to the control module.

Optionally, the control module is further configured to send a turn-off signal to the data transmission module, in the case that the detection module detects that the bus voltage is greater than or equal to the first preset voltage, so as to cause the data transmission module to enter a turn-off state.

Optionally, the control module is further configured to send a control signal to the driving module according to the configuration control information after receiving the configuration control information provided by the data transmission module, so that the driving module drives a load in an output module in response to the control signal, wherein the output module is connected to the driving module through the dual bus.

Optionally, the control module includes a microcontroller, a first zener diode, a first resistor, a second resistor, a third resistor, a fourth resistor, a fifth resistor, a sixth resistor, a seventh resistor, a first switching transistor, a second switching transistor, and a first capacitor; a first terminal of the first zener diode is connected to an input terminal of the control module, and a second terminal of the first zener diode is connected to a first terminal of the first resistor and a first terminal of the third resistor, respectively; a second terminal of the first resistor is connected to a first terminal of the second resistor and a first pin of the microcontroller, respectively; the first terminal of the second resistor is connected to the first pin of the microcontroller, and a second terminal of the second resistor is grounded; a second terminal of the third resistor is connected to a control terminal of the first switching transistor and a first terminal of the fourth resistor, respectively; the first terminal of the fourth resistor is connected to the control terminal of the first switching transistor, and a second terminal of the fourth resistor is grounded; a first terminal of the first switching transistor is connected to a first terminal of the sixth resistor and a control terminal of the second switching transistor, respectively, and a second terminal of the first switching transistor is grounded; the first terminal of the sixth resistor is connected to the control terminal of the second switching transistor, and a second terminal of the sixth resistor is connected to a second pin of the microcontroller; a first terminal of the second switching transistor is connected to a first terminal of the fifth resistor, and a second terminal of the second switching transistor is connected to a first terminal of the seventh resistor; a second terminal of the fifth resistor is connected to the input terminal of the control module, and a second terminal of the seventh resistor is grounded; a seventh pin of the microcontroller is grounded, an eighth pin of the microcontroller is connected to a first terminal of the first capacitor, and a second terminal of the first capacitor is grounded.

Optionally, the lamp power supply further includes a program data module connected to the dual bus, the program data module includes a circuit with a burner, the burner is configured to execute an operation of burning a program on a plurality of microcontrollers through a broadcast-type protocol, and each of the plurality of microcontrollers is integrated into a corresponding driver of the driving module.

According to another aspect of the present disclosure, the examples of the present disclosure provide a lighting system, which includes the lamp power supply according to any one of the examples of the present disclosure and a lamp connected to the lamp power supply.

The lamp power supply based on dual-bus control described in the examples of the present disclosure can directly configure the control information/data for lamps or products or devices through live/neutral (i.e., L/N) dual lines without the need to additionally provide (or introduce) two signal/data lines, which is capable of simplifying the structure and reducing the safety risk, reducing line materials and reducing the risk of connecting wrong lines, and reducing the workloads of production personnel and on-site installation personnel. The same is true for the lighting system described in the examples of the present disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

In the above-mentioned examples, the description of each example has its own focus, and parts of an example that are not described in detail may be found in the relevant descriptions of other examples.

The above is a detailed introduction to a lamp power supply based on dual-bus control and a lighting system provided by the examples of the present disclosure, the present disclosure applies specific examples to illustrate the principles and implementation methods of the present disclosure, and the description of the above examples is only used to help understand the technical solutions and core ideas of the present disclosure. An ordinary skilled in the art should understand that: it is still possible to modify the technical solutions recorded in the foregoing examples, or make equivalent substitutions for some of the technical features; and these modifications or substitutions do not cause the essence of the corresponding technical solutions to depart from the scope of the technical solutions of the examples of the present disclosure.

What is claimed is:

1. A lamp power supply based on dual-bus control, comprising:
   an input module configured for providing alternating current, a rectifying module configured for converting input alternating current into direct current, and a driving module configured for controlling load driving, wherein:
   the input module, the rectifying module and the driving module are connected to each other through a dual bus, and the lamp power supply further comprises:
   a detection module, configured to acquire and detect a bus voltage output by the rectifying module;
   a data transmission module, configured to transmit configuration control information; and
   a control module, configured to send a turn-on signal to the data transmission module to receive the configuration control information provided by the data transmission module, in the case that the detection module detects that the bus voltage is less than a first preset voltage, and
   wherein the detection module and the data transmission module are connected to the dual bus through respective wires, so that the detection module and the data transmission module are both connected to the rectifying module.

2. The lamp power supply according to claim 1, wherein the data transmission module is in a turn-off state by default.

3. The lamp power supply according to claim 1, wherein the control module is attached to the driving module or separated from the driving module.

4. The lamp power supply according to claim 1, further comprising a filtering module, wherein the filtering module is provided between the input module and the rectifying module, and is configured to filter the alternating current.

5. The lamp power supply according to claim 1, further comprising a power factor correction module, wherein the power factor correction module is provided between the rectifying module and the driving module, and is configured to adjust a power factor received by the driving module.

6. The lamp power supply according to claim 1, further comprising a power supply module, wherein the power supply module is connected to the dual bus through a corresponding wire, to cause the power supply module to be connected to the rectifying module; and the power supply module is configured to adjust the bus voltage provided by the rectifying module to a power supply voltage so as to supply power to the control module.

7. The lamp power supply according to claim 1, wherein the control module is further configured to send a turn-off signal to the data transmission module, in the case that the detection module detects that the bus voltage is greater than or equal to the first preset voltage, so as to cause the data transmission module to enter a turn-off state.

8. The lamp power supply according to claim 1, wherein the control module is further configured to send a control signal to the driving module according to the configuration control information after receiving the configuration control information provided by the data transmission module, so that the driving module drives a load in an output module in response to the control signal, wherein the output module is connected to the driving module through the dual bus.

9. The lamp power supply according to claim 1, wherein:
   the control module comprises a microcontroller, a first zener diode, a first resistor, a second resistor, a third resistor, a fourth resistor, a fifth resistor, a sixth resistor, a seventh resistor, a first switching transistor, a second switching transistor, and a first capacitor; and
   a first terminal of the first zener diode is connected to an input terminal of the control module, and a second terminal of the first zener diode is connected to a first terminal of the first resistor and a first terminal of the third resistor;
   a second terminal of the first resistor is connected to a first terminal of the second resistor and a first pin of the microcontroller; the first terminal of the second resistor is connected to the first pin of the microcontroller, and a second terminal of the second resistor is grounded;

a second terminal of the third resistor is connected to a control terminal of the first switching transistor and a first terminal of the fourth resistor; the first terminal of the fourth resistor is connected to the control terminal of the first switching transistor, and a second terminal of the fourth resistor is grounded;

a first terminal of the first switching transistor is connected to a first terminal of the sixth resistor and a control terminal of the second switching transistor, and a second terminal of the first switching transistor is grounded;

the first terminal of the sixth resistor is connected to the control terminal of the second switching transistor, and a second terminal of the sixth resistor is connected to a second pin of the microcontroller;

a first terminal of the second switching transistor is connected to a first terminal of the fifth resistor, and a second terminal of the second switching transistor is connected to a first terminal of the seventh resistor;

a second terminal of the fifth resistor is connected to the input terminal of the control module, and a second terminal of the seventh resistor is grounded; and a seventh pin of the microcontroller is grounded, an eighth pin of the microcontroller is connected to a first terminal of the first capacitor, and a second terminal of the first capacitor is grounded.

10. The lamp power supply according to claim 1, further comprising a program data module connected to the dual bus, wherein the program data module comprises a circuit with a burner, the burner is configured to execute an operation of burning a program on a plurality of microcontrollers through a broadcast-type protocol, and each of the plurality of microcontrollers is integrated into a corresponding driver of the driving module.

11. A lighting system, comprising a lamp power supply and a lamp connected to the lamp power supply, wherein the lamp power supply is based on dual-bus control and comprises:

an input module configured for providing alternating current, a rectifying module configured for converting input alternating current into direct current, and a driving module configured for controlling load driving, wherein:

the input module, the rectifying module and the driving module are connected to each other through a dual bus, and the lamp power supply further comprises:

a detection module, configured to acquire and detect a bus voltage output by the rectifying module;

a data transmission module, configured to transmit configuration control information; and a control module, configured to send a turn-on signal to the data transmission module to receive the configuration control information provided by the data transmission module, in the case that the detection module detects that the bus voltage is less than a first preset voltage, and wherein the detection module and the data transmission module are connected to the dual bus through respective wires, so that the detection module and the data transmission module are both connected to the rectifying module.

* * * * *